United States Patent [19]
Kilk et al.

[11] Patent Number: 5,748,613
[45] Date of Patent: May 5, 1998

[54] COMMUNICATION PACING METHOD

[75] Inventors: Erik Kilk, Battleground; Karen Van der Veer, Vancouver, both of Wash.; Leann M. MacMillan, West Linn, Oreg.

[73] Assignee: Hewlett-Packard Company, Palo Alto, Calif.

[21] Appl. No.: 626,224

[22] Filed: Mar. 29, 1996

[51] Int. Cl.$^6$ .............................. G06F 11/00; H04L 12/56
[52] U.S. Cl. .................... 370/231; 370/236; 370/473; 395/200.62
[58] Field of Search .................... 395/200.62, 200.63; 370/231, 235, 236, 465, 473

[56] References Cited

U.S. PATENT DOCUMENTS

| | | | |
|---|---|---|---|
| 4,543,644 | 9/1985 | Kozima et al. | 364/900 |
| 4,839,891 | 6/1989 | Kobayashi et al. | 370/231 |
| 5,123,061 | 6/1992 | Pritchard | 382/56 |
| 5,432,784 | 7/1995 | Ozveren | 370/235 |
| 5,432,824 | 7/1995 | Zheng et al. | 375/356 |
| 5,453,982 | 9/1995 | Pennington et al. | 370/85.1 |
| 5,515,359 | 5/1996 | Zheng | 370/231 |
| 5,528,591 | 6/1996 | Lauer | 370/231 |
| 5,633,867 | 5/1997 | Ben-Nun et al. | 370/399 |

FOREIGN PATENT DOCUMENTS

2226738 A  5/1989  United Kingdom.

*Primary Examiner*—Hassan Kizou

[57] ABSTRACT

The present invention provides a method of pacing a stream of data transmitted from a data source to a buffered data destination with a determined number of available storage units, the data destinations being configured to consume data and thereby to free storage units for receipt of additional data. The pacing of data communication includes: (1) identifying a beginning credit value; (2) incrementing the beginning credit value with each storage unit freed to identify an present credit value; (3) transmitting units of data in accordance with determined limits, the number of data units sent providing a transmission count; (4) selectively updating the determined number of available storage units by determining the difference between the beginning credit value and the present credit value, and determining the sum of the result and the previously determined number of available storage units to provide an updated determined number of available storage units; and (5) selectively updating the determined number of available storage units by determining the difference between the transmission count and the previously determined number of available storage units to provide an updated determined number of available storage units.

18 Claims, 4 Drawing Sheets

COMMUNICATION PACING METHOD

TECHNICAL FIELD

The present invention relates generally to data communications, and more particularly, to a method of pacing data which is to be transmitted from a data source to one or more data destinations. More particularly still, the invention concerns a method of optimally pacing separate data streams via a single pacing communication link.

BACKGROUND ART

In a conventional communication system, it is often desirable to utilize multiple types of data exchanges between a transmitter and a receiver. For example, in a modern ink-jet printer work station, both image data and command data are sent by the host processor (i.e., personal computer) to the printer for interpretation of the commands and printing of the image data by the printer's controller. Such command interpretation and image data printing typically are performed by firmware control on a byte-by-byte basis, each type of data being stored in a separate memory buffer for consumption by the printer.

However, because many printer subsystems are connected to a variety of host processors, and because such host processors employ a variety of input/output (IO) ports using a variety of protocols (e.g., Multiple Logical Channels are used with many ink-jet and laser-jet printer products from Hewlett-Packard Company), it is difficult to construct a single scheme for controlling such multiple-device communications. Further, because different types of data are consumed at different rates, it may be desirable to transmit one type of data at a first rate and another type of data at a second rate so as to prevent communication deadlock. This is most desirably accomplished by pacing separate data streams individually, a solution which has heretofore proven difficult to implement.

One problem, in particular, relates to the loss of pacing information as a result of an unreliable communication link. This can result in an inaccurate determination of the space available in one or more of the printer's memory buffers, leading to less than optimal printer operation, or even communication deadlock. Although layered network architectures have been developed to improve reliability of communication links, such solutions typically have required dedicated hardware in the host processor, and have employed substantial memory and software or code. Further, most prior art solutions have required bidirectional IO hardware support, an arrangement which is preferable, but not always available.

DISCLOSURE OF THE INVENTION

In accordance with our teachings, the present invention relates to a method of pacing a stream of data transmitted from a data source such as a personal computer to one or more buffered data destinations such as the command and image channels of a printer. Each data destination has a number of available storage units (i.e., credit), such number preferably being initially determined at the time communication begins. Storage units hold correspondingly sized units of data which are received from the data source at a pace determined by the number of storage units which are free at the desired data destination.

The data destinations are configured to consume data and thereby to free storage units for receipt of additional data, the pacing of data communication for each data destination including: (1) identifying a beginning credit value of the data destination; (2) incrementing the beginning credit value with each storage unit freed at that data destination to identify an present credit value for such data destination; (3) transmitting units of data to the relevant data destination, the number of data units transmitted to the data destination providing a corresponding transmission count, data unit transmission to that data destination being limited to no more than the determined number of available storage units of that data destination; (4) selectively updating the determined number of available storage units for the relevant data destination by determining the difference between the beginning credit value and the present credit value of the specified data destination to identify a number of storage units freed at that data destination since identifying its beginning credit value, and determining the sum of the previously determined number of available storage units at the relevant data destination and the number of storage units freed at that data destination to provide an updated determined number of available storage units for the data destination; and (5) selectively updating the determined number of available storage units for the relevant data destination by determining the difference between the corresponding transmission count and the previously determined number of available storage units at the relevant data destination to provide an updated determined number of available storage units for the data destination. The beginning credit value of the data destination is reset as the present credit value determined for that data destination upon completing the pacing operation.

Pacing typically is performed periodically, pacing information being transmitted from a data destination to a data source for use in pacing data from the data source to the data destination over a data channel. Pacing information for multiple data channels may be transmitted via a single communication link, the communication link being configured by: appending predefined header information onto a first set of data (e.g., pacing information), the header information identifying the location to which the first set of data is to be transmitted, thereby to produce a first packet; appending predefined header information onto a second set of data (e.g., pacing information), the header information identifying the location to which the second set of data is to be transmitted, thereby to produce a second packet; concatenating the first and second packets to produce a plural-packet data stream; causing the data stream to be communicated over a single communication link; and stripping the header information from the first and second packets and routing the first and second packets to locations based upon said location-identifying header information.

These and other objects and advantages of the present invention will be more readily understood after a consideration of the drawings and the detailed description of the preferred embodiment which follows.

DETAILED DESCRIPTION OF THE PREFERRED EMBODIMENTS AND BEST MODE FOR CARRYING OUT THE INVENTION

Figure 1:
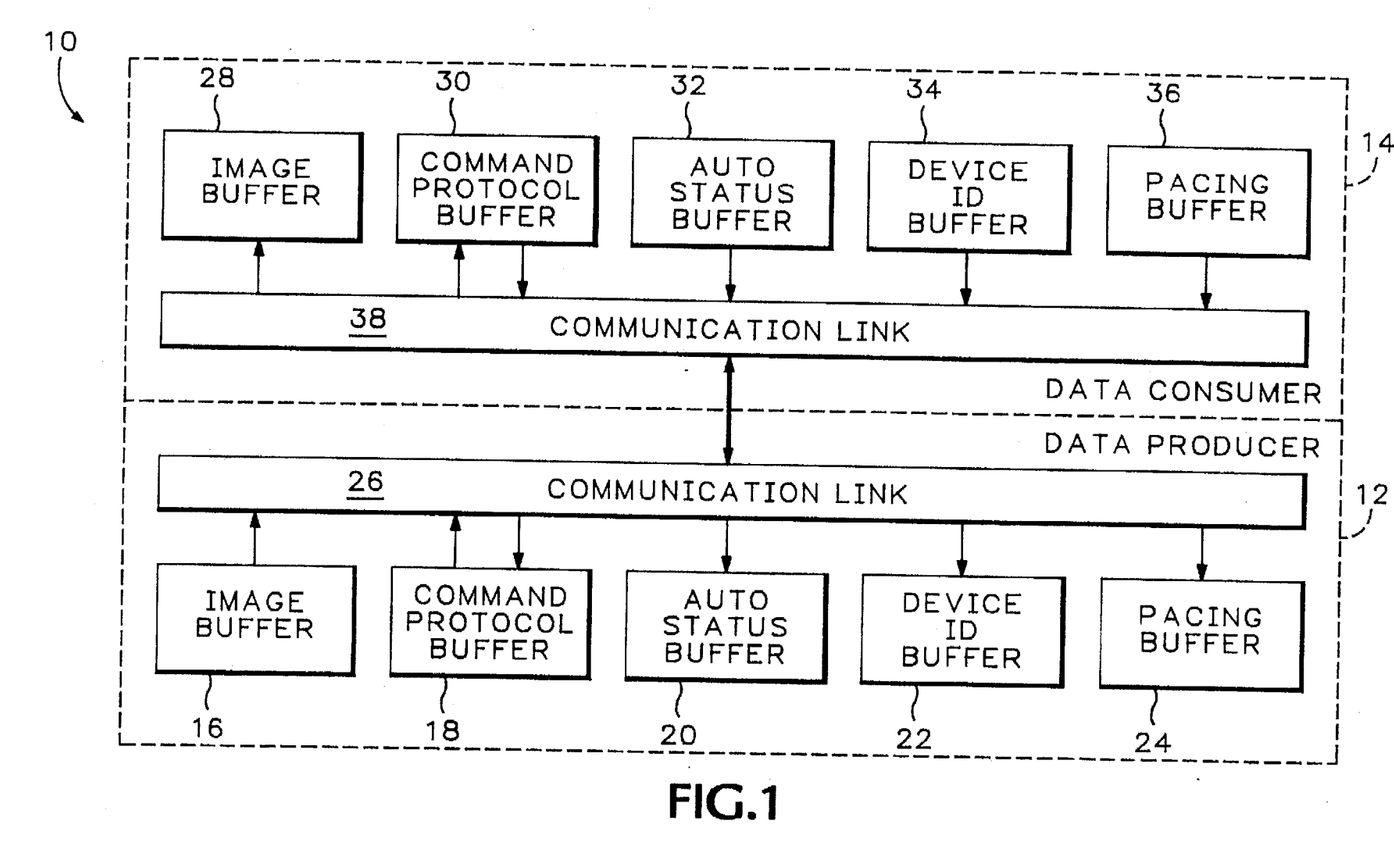
FIG. 1 is a block diagram depicting a communication system which employs the invented method.

FIG. 1 shows, at 10, a communication system in block diagram form, such system including a data producer 12 and a data consumer 14. Those skilled in the art will appreciate that the direction of the arrows in FIG. 1 indicate the direction of the communication flow, whether in the form of commands, image data, pacing information, or the like.

Those of skill in the art will appreciate that data producer 12 may be a PC (or file server), or any other data-producing device. Similarly, data consumer 14 may be a printer, scanner, facsimile machine, or any other data-consuming device. In the present disclosure, data producer 12 will be described and illustrated as a PC, and data consumer 14 will be described and illustrated as an ink-jet printer. Further, it is noted that reference herein to data producer 12 as a producer and to data consumer 14 as a consumer is meant as a description, not a limitation. Therefore, it will be understood that data producer 12 typically also is a consumer, and that consumer 14 typically also is a producer. Data consumer 14, for example, produces pacing information for receipt and consumption by data producer 12. Communication thus will be understood to be a two-way street, although there may be times when it seems largely one-way.

Referring still to FIG. 1, it will be understood that data producer 12 typically includes a memory and a processor capable of providing an image buffer 16, a command protocol buffer 18, an auto-status buffer 20, a device ID buffer 22, and a pacing buffer 24. The data producer also includes hardware, software or firmware for use in establishing and maintaining either unidirectional or bidirectional communication with the data consumer, which hardware, software or firmware is referred to generally herein as communication link 26. Similarly, data consumer 14 includes a memory and a processor capable of providing an image buffer 28, a command protocol buffer 30, an auto-status buffer 32, a device ID buffer 34, and a pacing buffer 36. The data consumer also employs hardware, software or firmware, referred to generally as communication link 38. It will be appreciated that it is within the spirit and scope of the invention for communication links 26, 38 to be implemented in hardware, software, firmware or any combination thereof.

Figure 2:
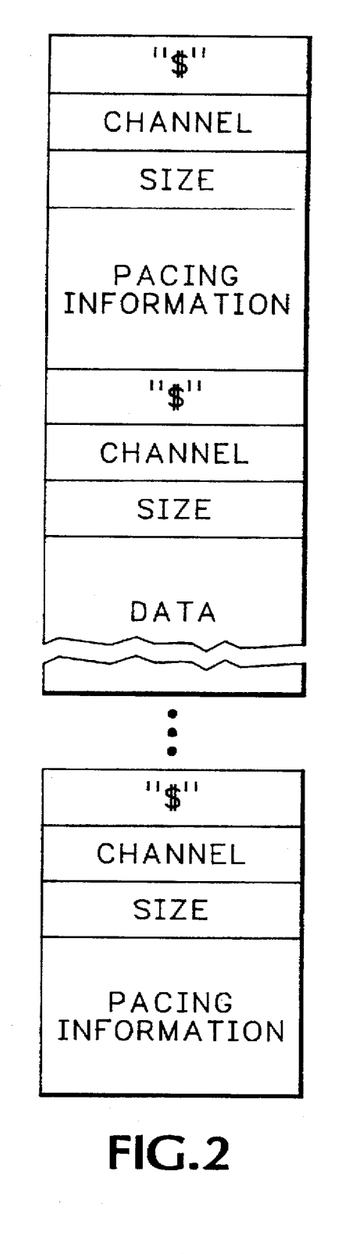
FIG. 2 schematically depicts a stream of data produced and consumed by the communication system of FIG. 1.

Focussing now on the communication link, it is to be understood that data consumer 14 packetizes data (e.g., pacing information) for transmission to data producer 12 in accordance with a packetizing protocol implemented by communication link 38. A preferred embodiment packetizing protocol is illustrated in FIG. 2. Typically, data producer 12 packetizes data for transmission to data consumer 14 in accordance with the same packetizing protocol, but the data producer's packetizing protocol is implemented by communication link 26.

As indicated in FIG. 2, the first byte of each packet is an 8-bit start byte (e.g., the ASCII code for "$"). The second byte of each packet is an 8-bit channel identifier or channel ID byte, which identifies the channel in data producer 12 to which the packet is directed. In the preferred embodiment, all pacing information is sent to a single channel (e.g., Channel n) for proper distribution of the pacing information as will be described below. The third and forth bytes of each packet are the packet size field, which defines the number of bytes to follow before the end of the packet will be assumed. Finally, the fifth and any subsequent bytes of each packet are the data, which may, for example, include pacing information.

Figures 3, 5:
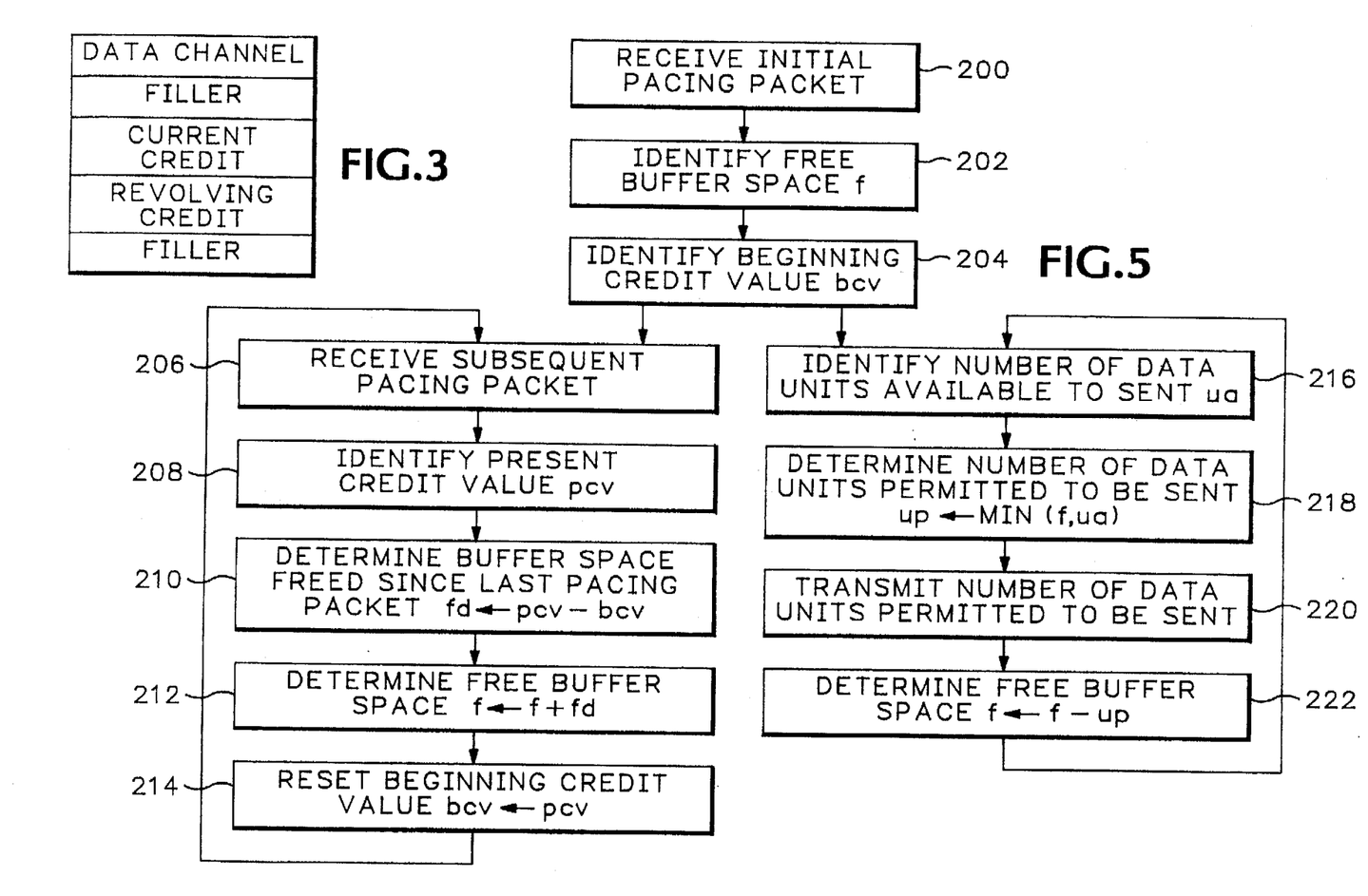
FIG. 3 schematically depicts pacing information contained in a pacing of a data stream packet such as that shown in FIG. 2.
FIG. 5 is a flow chart demonstrating a preferred embodiment of the invented pacing method.

Although the aforementioned size field provides for use of data which is up to 64k-bytes long (where $k=2^{10}$) pacing information typically is only 12-bytes long in the preferred embodiment. As indicated in FIG. 3, such pacing information includes an 8-bit data channel field which identifies the data channel which is to be paced (i.e., a data destination of the data consumer), a 32-bit current credit field which provides a unit-count (e.g., byte-count) of the free buffer space (f) in the specified channel's buffer, and a 32-bit revolving credit field which identifies a present credit value (pcv) for use in updating the free buffer space count (the current credit field is only accurate in determining the free buffer space count at the time of start-up when the pipeline for data to the channel's buffer is clear).

The revolving credit field carries a credit value which has been advanced by a number corresponding to the number of storage units (e.g., bytes) freed since the last time a pacing packet was formatted. The revolving credit value typically is configured to roll over to 0 upon passing a predetermined maximum value. However, this roll over does not prevent the determination of the difference between an earlier revolving credit value and a subsequent revolving credit value.

In accordance with the invention, packets may emanate from one or more sources, including data destinations to which data from data producer 12 is sent. Additionally, packets may be sent to one or more locations, including data sources from which data for consumption by data consumer 14 emanates. However, as indicated in FIG. 2, pacing information may be multiplexed, packetized and concatenated to form a single communication stream.

Those skilled in the art will understand that the above-described communication stream may be transmitted from data consumer 14 to data producer 12 via any hardware communication link and under any software communication protocol used thereon. In other words, the communication system will operate whether the multiplexed and packetized pacing information is communicated bit serially (e.g., over a single bit-serial communication link), or over a plural-bit parallel communication link, or simply across a bus of any bit width.

Figure 4:
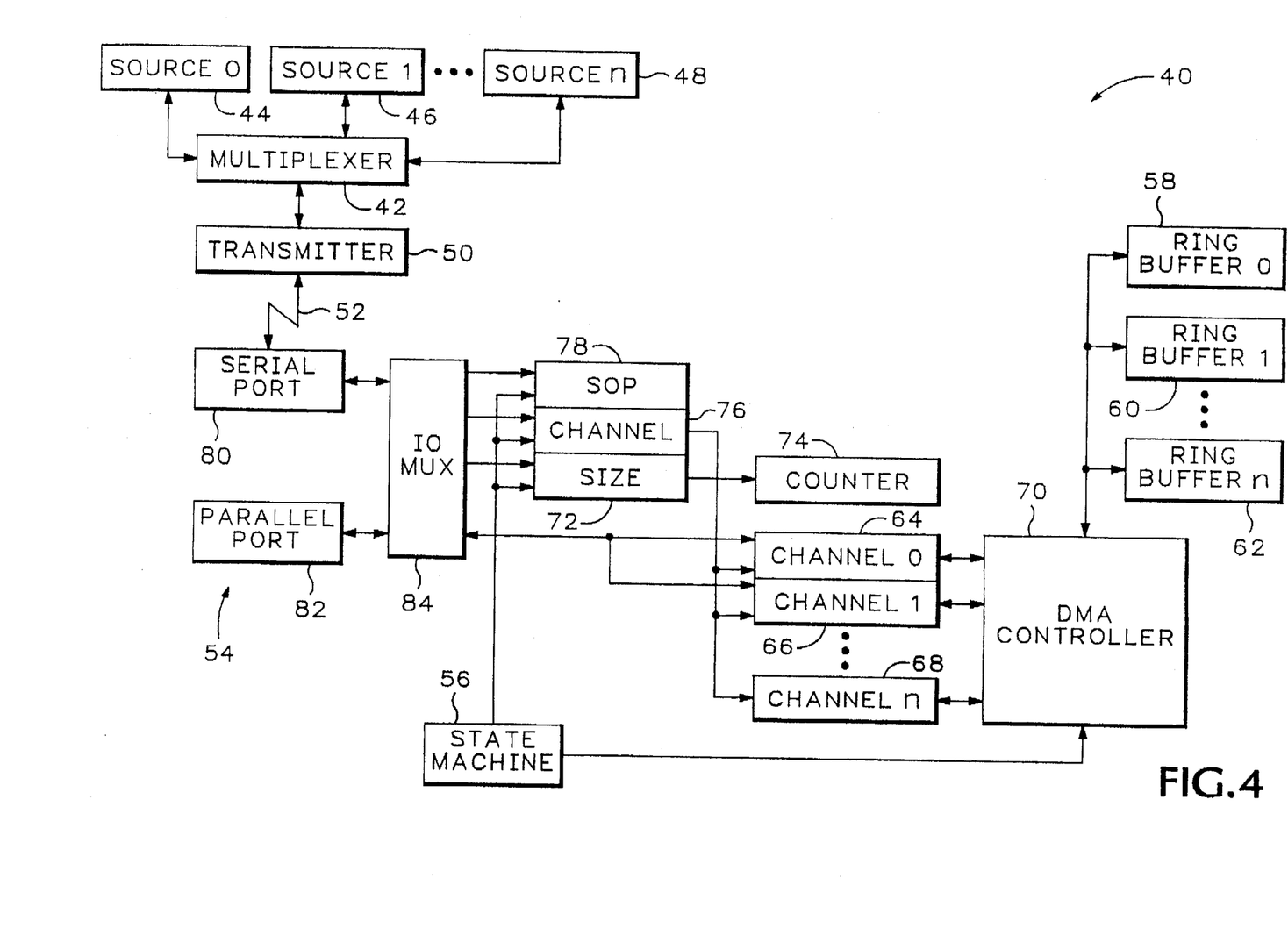
FIG. 4 is a detailed block diagram showing hardware which typically may be employed by the communication system of FIG. 1.

Turning now to FIG. 4, it will be noted that a communication apparatus 40 has been depicted, such apparatus being configured for use in multiplexing packetized pacing information at a first location and for demultiplexing such packetized pacing information at a second location. Preferably, apparatus 40 includes a multiplexer 42 for concatenating packets (indicated in FIG. 4 by directed flow lines) containing channel information from one or more sources 44, 46, 48. A transmitter 50 communicates the concatenated packetized pacing information along a single communication link 52 to a receiver. It will be understood that sources 44, 46, 48, multiplexer 42 and transmitter 50 may be thought of collectively as a pacing information originator like data consumer 14. Each source is, in fact, a buffered data destination of the data consumer.

Apparatus 40 also preferably includes a pacing information receiver like data producer 12 including a receiver indicated generally at 54 for receiving the concatenated packetized pacing information from single communication link 52, and a state machine 56 for controlling the unpacking and routing of the packetized pacing information by decoding and stripping the channel information from each packet and storing each of the packets in one or more buffers 58, 60, 62 corresponding with the channel information. It will be appreciated that buffers such as ring buffers 58, 60, 62 correspond with channels 64, 66, 68, which are conduits that are more a logical than a physical construct. These channels may carry pacing information, or may carry other data or information from the data consumer. Further, it will be appreciated that a typical data producer such as a PC will utilize a single channel (e.g., Channel n) for receipt of pacing information for pacing its various data channels. Such pacing information thereafter will be routed appropriately to effect proper pacing of each data channel.

Apparatus 40 preferably further includes a direct memory access (DMA) controller 70 operatively connected with state machine 56 and with buffers 58, 60, 62 for writing the packets into memory. Those of skill in the art will appreciate that, within the spirit and scope of the invention, any memory storage scheme may be used.

Where the packetized pacing information includes a header containing a packet length indicator, as illustrated in FIG. 2, apparatus 40 further includes a first hardware register 72 ("SIZE") operatively coupled with state machine 56 for storing the length indicator. Where the packet contains one or more entities, apparatus 40 further will further include a counter 74 operatively coupled with first hardware register 72 for indicating when the number of entities contained in each packet have been stored in a corresponding one of buffers 58, 60, 62. Where the packetized pacing information includes a destination channel identifier, apparatus 40 further includes a second hardware register 76 operatively coupled with state machine 56 for storing the channel identifier. Finally, where the packetized pacing information includes a start-of-packet (SOP) identifier, apparatus 40 further includes a third hardware register 78 operatively coupled with state machine 56 for comparing received concatenated packetized pacing information with the predefined SOP identifier and for controlling registers 72, 76.

In some implementations of the invented apparatus, in which pacing packets may arrive at the second location via one of two or more input/output (IO) ports such as a serial port 80 and a parallel port 82, apparatus 40 may further include an IO multiplexer or selector 84 for selecting a conduit for pacing information from one or the other of the IO ports.

Referring now to FIG. 5, a flow chart depicting operation of the data source in accordance with a preferred embodiment of the invented communication pacing method is provided. It will be appreciated that flow-charting conventions have been adopted that result in a generally top-to-bottom, left-to-right control flow indicated by arrows, and that action blocks are indicated by rectangles and decision blocks by diamonds. Left-pointing arrows within the action blocks represent the assignment of a value to a variable.

The flow chart is followed independently for each data channel which is to be paced, such data channel being identified within the pacing information as indicated in FIG. 3. Further, packets need not necessarily be received in accordance with the communication protocol described above, so long as the data channel, current credit and revolving credit are communicated to the data source for use as will now be described.

The preferred communication pacing method begins with the receipt of an initial pacing packet at 200, such packet including a data channel field which specifies the data channel for which pacing information is provided, a current credit field which provides an initial count of the number of storage units (e.g., bytes) available for receipt of data in the specified data channel, and a revolving credit field which typically includes a pointer value which is advanced by the data consumer as storage units in the specified channel become available. Upon receiving the initial pacing packet for a channel, that channel's free buffer space (i.e., the number of storage units available) is identified at 202, the free buffer space (f) initially being defined by the current credit field of the initial pacing packet. A beginning credit value (bcv) similarly is identified at 204, the beginning credit value being defined by the revolving credit field of the initial pacing packet. Thereafter, pacing and data transmission operations occur repeatedly, and in overlapping (time interleaved) fashion, each operation being represented by separate, but related, branches of the depicted flow chart.

The pacing operation begins with the receipt of a subsequent pacing packet at 206. Those skilled will understand that such subsequent pacing packets may be received periodically at a predetermined rate, or may be received somewhat less consistently, either by design or due to an unreliable communication link. In either case, the data transmission operation will continue as long as it is determined that there is available buffer space in the specified data destination buffer (i.e., as long as f>0).

Upon receiving a subsequent pacing packet, a present credit value (pcv) is identified at 208, the present credit value being defined by the revolving credit field of that pacing packet. With the beginning credit value (bcv) and present credit value (pcv) identified, it is possible to accurately determine the number of storage units which have been freed in the specified channel's buffer since the beginning credit value was identified. The revolving credit, it will be recalled, advances with each storage unit freed. The buffer space freed (fd) thus is defined at 210 by determining the difference between the beginning credit value and the present credit value (fd←pcv−bcv). The free buffer space value (f) is updated at 212 by determining the sum of the previously determined free buffer space and the buffer space freed (f←f+fd). The present credit value then is stored as the beginning credit value (bcv←pcv) at 214 for use in the next pacing operation.

The transmission operation correspondingly is carried out by the data producer, data being sent to the specified channel's buffer (data destination) only so long as there is data to be sent and free buffer space remains. Accordingly, it will be noted that the depicted transmission operation begins at 216 by identifying the number of data units available for sending (ua) to the specified channel buffer, and proceeds at 218 by determining the number of data units permitted to be sent (up) to the specified channel buffer. Those skilled will appreciate that the number of data units permitted to be sent is the lesser of the number of data units available (ua) and the number of storage units free (f). This is represented by the expression: up←MIN(f,ua). Data then is transmitted to the specified channel buffer at 220, and the free buffer space value (f) is updated at 222 to reflect receipt of the data units sent (f←f−up). It thus will be appreciated that the free buffer space value is updated both by the pacing and transmission operations.

Because the pacing updates determine free buffer space based on a change in recorded buffer space (rather than simply upon a newly-freed-space identifier received from the data destination), an accurate tally of buffer space free is possible. Further, the just-described communication pacing method is followed for each data channel, and may occur in overlapping (time-interleaved) fashion in accordance with the communication link protocol described herein. Accordingly, each data channel is paced independently, diminishing the possibility of communication lock-up due to one, but not all, of the data channel buffers becoming full.

Therefore, the proposed method of pacing a stream of data transmitted from a data source to one or more buffered data destinations involves: (1) identifying a beginning credit value of the data destination; (2) incrementing the beginning credit value with each storage unit freed at that data destination to identify a present credit value for such data destination; (3) transmitting units of data to the relevant data destination, the number of data units transmitted to the data destination providing a corresponding transmission count, data unit transmission to that data destination being limited to no more than the determined number of available storage units of that data destination; (4) selectively updating the determined number of available storage units for the relevant data destination by determining the difference between the beginning credit value and the present credit value of the specified data destination to identify a number of storage units freed at that data destination since identifying its beginning credit value, and determining the sum of the previously determined number of available storage units at the relevant data destination and the number of storage units freed at that data destination to provide an updated determined number of available storage units for the data destination; and (5) selectively updating the determined number of available storage units for the relevant data destination by determining the difference between the corresponding transmission count and the previously determined number of available storage units at the relevant data destination to provide an updated determined number of available storage units for the data destination.

Figure 6:
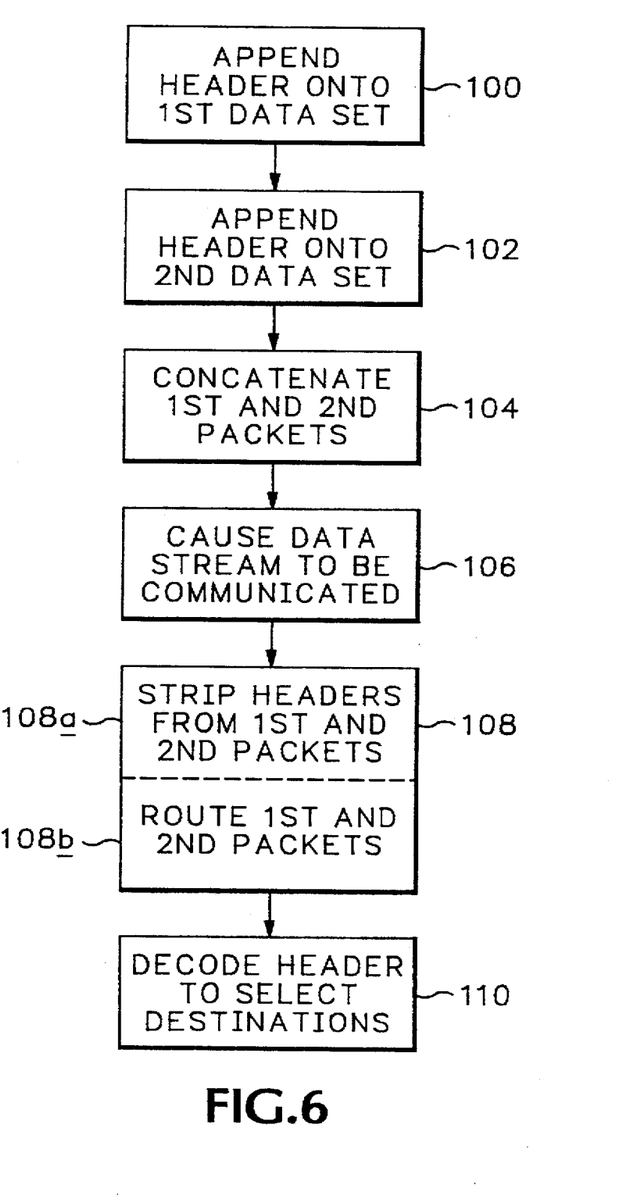
FIG. 6 is a flow chart demonstrating a method of communicating pacing information for multiple channels over a single communication link.

Referring finally to FIG. 6, the transmission operation (whether transmitting pacing information or data) is further illustrated by a flow chart representing the manner in which apparatus 40 has been described to operate. As indicated, the proposed transmission operation is capable of multiplexing data (image data, command data, pacing information, etc.) from two sources onto a single communication link and for demultiplexing and storing the data into two destinations. Preferably, the method includes: (1) at 100, appending predefined header information onto a first set of data, the header information identifying a first destination for the first set of data, thereby to produce a first packet; (2) at 102, appending predefined header information onto a second set of data, the header information identifying a second destination for the second set of data, thereby to produce a second packet; (3) at 104, concatenating the first and the second packets to produce a plural-packet data stream; (4) at 106, causing the data stream to be communicated over a single data link to the two destinations; and (5) at 108, including (5a) at 108a stripping the header information from the first and the second packets within the data stream, and (5b) at 108b routing the first and the second packets to the appropriate one of the two destinations based upon the destination-identifying header information for storage of the first and the second packets.

Preferably, and as best illustrated in FIG. 2, the header information further includes a length identifier for each of the first and the second packets. Also preferably, the length identifiers are data unit counts, which further comprises storing each of the length identifiers and using the same to indicate when each of the first and the second packets have been routed for storage. Also preferably, the header information further includes a predefined start-of-packet indicator, although it will be appreciated that alternative methods of indicating a start of a packet, within the spirit and scope of the invention, may be devised.

Preferably, the invented method further includes (6) at 110, decoding the destination-identifier header information to select the first and the second of said two destinations. As is pointed out above by reference to FIG. 4, it is preferable that the routing for storage sub-step (5b), indicated in FIG. 4 at 108b, is performed via direct memory access, as by use of DMA controller 70.

Exception handling may be performed in a number of ways. In a preferred communication subsystem, if the destination detects loss of data or packet framing, it takes two distinct actions that render the protocol compatible with a variety of sources. First, it sends auto-status to the source indicating that it has experienced a loss of data or frame sync. It also times out for a few seconds and then begins again to look for a start-of-packet byte. Thus, regardless of whether the source polls the auto-status of the destination, nevertheless it may continue to send data to the destination, with the loss of data or sync resulting simply in an easily detected missing or garbaged page. This enables the transmission operation to operate with nearly any driver software and with any IO port hardware or software protocol, whether unidirectional or bidirectional.

The proposed pacing method is further adaptable for use in connection with a data producer which is not able (or is not willing) to receive pacing information by providing for automated conversion of the system. If pacing information is ignored by data producer 12, pacing will occur in accordance with IEEE-1284 Compatibility, or ECP hold off of data by keeping the BUSY line (not shown) of data consumer 14 high (active).

INDUSTRIAL APPLICABILITY

Accordingly, it may be seen that the invented communication pacing method provides a significant improvement over previously employed pacing methods by facilitating reliable determination of pacing information by the data source data via pacing packets from one or more intended destination buffers. Firmware and its attendant RAM and ROM hardware support circuitry is reduced, and the method is compatible with a variety of existing data producers, data sources and IO hardware links, whether unidirectional or bidirectional. Accordingly, the performance of printers, scanners, facsimile equipment, and other devices is greatly enhanced by use of the invention.

While the present invention has been shown and described with reference to the foregoing preferred embodiment, it will be apparent to those skilled in the art that changes in form and detail may be made therein without departing from the spirit and scope of the invention as defined in the appended claims.

We claim:

1. A method of pacing a stream of data units transmitted from a data source to a specified buffered data destination having a determined number of available storage units upon initiating a communication, such data destination being configured to consume data units and thereby to free storage units for receipt of additional data units, the method comprising the steps of:

identifying a beginning credit value;

incrementing the beginning credit value with each storage unit freed to identify a present credit value;

transmitting data units to the data destination, the number of data units transmitted providing a transmission count, data unit transmission being limited to a transmission count which is no more than the determined number of available storage units;

selectively updating the determined number of available storage units by determining the difference between the beginning credit value and the present credit value to identify a number of storage units freed since last identifying the beginning credit value, and determining the sum of the previously determined number of available storage units and the number of storage units freed to provide an updated determined number of available storage units; and selectively updating the determined number of available storage units by determining the difference between the transmission count and the previously determined number of available storage units to provide an updated determined number of available storage units.

2. The method of claim 1 which further comprises selectively repeating said identifying, incrementing, transmitting and updating steps.

3. The method of claim 2, wherein the beginning credit value is the present credit value of the previous incrementing step.

4. The method of claim 2 which further comprises periodically transmitting pacing information from the data destination to the data source.

5. The method of claim 4, wherein said pacing information includes the present credit value, the present credit value being determined by incrementing a revolving credit field with each storage unit freed at the specified data destination.

6. The method of claim 4, wherein said identifying, incrementing, and updating steps are repeated each time pacing information is received by the data source.

7. The method of claim 1, wherein the transmitting step further includes identifying the number of data units available to send and determining the number of data units permitted to be sent, the number of data units transmitted being the lesser of the number of data units available to be sent and the number of data units permitted to be sent.

8. A method of pacing a stream of data units transmitted from a data source to one or more buffered data destinations, each data destination having a determined number of available storage units upon initiating a communication with such data destination, such data destinations being configured to consume data units and thereby to free storage units for receipt of additional data units, the pacing of data units for each data destination comprising the steps of:

specifying a data destination;

identifying a beginning credit value of the specified data destination;

incrementing the beginning credit value with each storage unit freed at the specified data destination to identify a present credit value of the specified data destination;

transmitting data units to the specified data destination, the number of data units transmitted to the specified data destination providing a corresponding transmission count, data unit transmission to the specified data destination being limited to no more than the determined number of available storage units of the specified data destination;

selectively updating the determined number of available storage units for the specified data destination by determining the difference between the beginning credit value and the present credit value of the specified data destination to identify a number of storage units freed at the specified data destination since last identifying the beginning credit value of the selected data destination, and determining the sum of the previously determined number of available storage units and the number of storage units freed at the specified data destination to identify an updated determined number of available storage units for the specified data destination; and selectively updating the determined number of available storage units for the specified data destination by determining the difference between the corresponding transmission count and the previously determined number of available storage units for the specified data destination to provide an updated determined number of available storage units for the selected data destination.

9. The method of claim 8, wherein the beginning credit value of the specified data destination is defined as the present credit value of the specified data destination upon completing a corresponding next-previous incrementing step for the specified data destination.

10. The method of claim 8 which further comprises periodically transmitting pacing information from each data destination to the data source.

11. The method of claim 10, wherein said pacing information includes the present credit value, the present credit value of each data destination being determined by incrementing a revolving credit field with each storage unit freed at the specified data destination.

12. The method of claim 10, wherein said identifying, incrementing, and updating steps are repeated each time pacing information for the specified data destination is received by the data source.

13. The method of claim 10, wherein pacing information is transmitted from one or more data destinations to a data source via a single communication link, the communication link being configured by:

appending predefined header information onto a first set of pacing information, said header information identifying the data source to which the first set of pacing information is to be transmitted, thereby to produce a first packet;

appending predefined header information onto a second set of pacing information, said header information identifying the data source to which the second set of pacing information is to be transmitted, thereby to produce a second pacing packet;

concatenating the first and second packets to produce a plural-packet data stream;

causing the stream to be communicated over a single pacing information link;

stripping the header information from the first and second pacing information packets and routing the first and second pacing information packets to the data source based upon said data-source-identifying header information.

14. The method of claim 13, wherein the header information further includes a pacing information length identifier.

15. The method of claim 13, wherein said header information further includes a predefined start-of-packet indicator.

16. The method of claim 13, wherein said pacing information includes a specified data destination identifier.

17. The method of claim 13, wherein said pacing information includes a present credit value of the specified data destination.

18. The method of claim 8, wherein the transmitting step further includes identifying the number of data units available to send and determining the number of data units permitted to be sent, the number of data units transmitted being the lesser of the number of data units available to send and the number of data units permitted to be sent.

* * * * *